Figure 1:
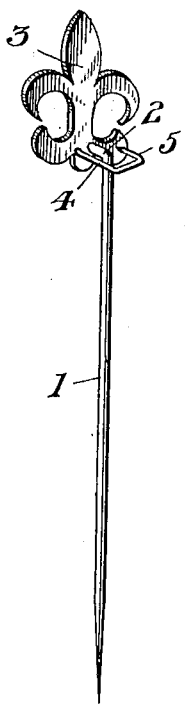

W. M. BROTHERS.
SAFETY DEVICE FOR PINS.
APPLICATION FILED APR. 30, 1912.

1,055,130.

Patented Mar. 4, 1913.

WITNESSES
J. P. Appleman,
Ralph C. Evert.

INVENTOR
W. M. Brothers
BY
ATTORNEYS.

UNITED STATES PATENT OFFICE.

WILLIAM M. BROTHERS, OF VENUS, PENNSYLVANIA, ASSIGNOR OF SEVEN-SIXTEENTHS TO CHARLES C. KORB, OF VENUS, PENNSYLVANIA.

SAFETY DEVICE FOR PINS.

1,055,130.  Specification of Letters Patent.  Patented Mar. 4, 1913.

Application filed April 30, 1912. Serial No. 694,050.

*To all whom it may concern:*

Be it known that I, WILLIAM M. BROTHERS, a citizen of the United States of America, residing at Venus, in the county of Venango and State of Pennsylvania, have invented certain new and useful Improvements in Safety Devices for Pins, of which the following is a specification, reference being had therein to the accompanying drawing.

This invention relates to safety devices for pins, and the primary object of my invention is to furnish a scarfpin with simple and effective means, as hereinafter set forth, for locking the pin relatively to a scarf or necktie, whereby the pin cannot become accidentally displaced or lost.

A further object of this invention is to provide a scarfpin with a safety device that is inexpensive to manufacture, durable and highly efficient for the purposes for which it is intended.

I attain the above objects by a mechanical construction that will be hereinafter specifically described and then claimed, and reference will now be had to the drawing, wherein:—

Figure 2:
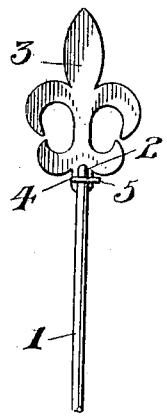
Figure 3:
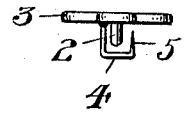

Figure 1 is a perspective view of a pin in accordance with this invention, Fig. 2 is a rear elevation of a portion of the same, and Fig. 3 is a plan of the pin.

The reference numeral 1 denotes a pin having the upper end thereof bent at right angles, as at 2 and provided with a head 3. The rear side of the head 3, adjacent to the angle end of the pin 1, has a rearwardly projecting lateral hook 4 that surrounds the upper end of the pin 1 and has the bill 5 thereof in proximity to the head 3.

After the pin is inserted in a scarf or piece of fabric, the piece of fabric can be caught upon the bill 5 of the hook 4 and the hook extended into the fabric sufficiently to prevent vertical displacement of the pin 1, it being necessary to shift the piece of fabric out of engagement with the hook 4 before the pin can be removed.

The safety device is applicable to various types of pins.

What I claim:—

A scarf pin comprising the combination with the head and shank of the pin, said shank having an angular upper portion projecting toward and secured to the inner face of the head, of a rearwardly extending U-shaped member adapted to have one of its legs fixedly secured to the rear of the head of the pin and its other leg free of the head of the pin and pointed, said pointed end spaced from the head of the pin, said member surrounding the angular portion of the shank of the pin, and said member further adapted to be disposed at right angles with respect to the rear of said head.

In testimony whereof I affix my signature in the presence of two witnesses.

WILLIAM M. BROTHERS.

Witnesses:
 GEO. E. OGILVIE,
 C. C. KORB.

---

Copies of this patent may be obtained for five cents each, by addressing the "Commissioner of Patents, Washington, D. C."